United States Patent [19]

Mellors

[11] 4,186,249

[45] Jan. 29, 1980

[54] SOLID STATE ELECTROLYTES

[75] Inventor: Geoffrey W. Mellors, North Royalton, Ohio

[73] Assignee: Union Carbide Corporation, New York, N.Y.

[21] Appl. No.: 973,554

[22] Filed: Dec. 27, 1978

[51] Int. Cl.² .............................................. H01M 6/18
[52] U.S. Cl. ................................................... 429/191
[58] Field of Search ......................................... 429/191

[56] References Cited

U.S. PATENT DOCUMENTS

| | | | |
|---|---|---|---|
| 2,718,539 | 9/1955 | Bradshaw | 429/191 |
| 3,657,016 | 4/1972 | Lilly et al. | 429/191 |
| 3,973,990 | 8/1976 | Borger et al. | 136/6 L |
| 4,118,549 | 10/1978 | Linag et al. | 429/191 |

FOREIGN PATENT DOCUMENTS 2330127  5/1977  France .

OTHER PUBLICATIONS

Schoonman, A Solid State Galvanic Cell with Fluoride-Conducting Electrolytes, J. Electro. Chem. Science and Techno., Dec. 1976, p. 1772.

*Primary Examiner*—Donald L. Walton
*Attorney, Agent, or Firm*—Cornelius F. O'Brien

[57] ABSTRACT

Solid state electrolyte comprising an ionically conductive product of a fused binary mixture of lead fluoride and a selected alkali salt of sodium, potassium, rubidium and cesium in a range of 0.1 to 15.0 mole percent.

13 Claims, No Drawings

SOLID STATE ELECTROLYTES

FIELD OF THE INVENTION

The invention relates to a solid state electrolyte based on a fused binary mixture containing lead fluoride.

BACKGROUND OF THE INVENTION

Ionic conductivity is usually associated with the flow of ions through an aqueous solution of metallic salts. In the vast majority of practical uses of ionic conductors, i.e., as electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the necessity of including a large volume of immobilizing material has hindered the aims of miniaturization.

In attempting to overcome the shortcomings of liquid systems, investigators have surveyed a large number of solid compounds hoping to find compounds which are solid at room temperature and have specific conductances approaching those exhibited by the commonly used liquid systems. Most solids have specific conductances at room temperature (20° C.) in the range of $10^{-6}$ to $10^{-15}$ ohm$^{-1}$ cm.$^{-1}$ as compared to aqueous solutions of salts which nominally have a specific conductance of 0.5 to 0.8 ohm$^{-1}$ cm.$^{-1}$.

In addition to the shortcomings of liquid systems, improved microelectronic circuit designs have generally decreased the current requirements for electronic devices. This in turn has enhanced the applicability of solid electrolyte power sources which usually can only deliver currents in the microampere range. These solid electrolyte systems have the inherent advantages of being free of electrolyte leakage and internal gassing problems due to the absence of a liquid phase and corrosion phenomena. In addition, they also have a much longer shelf life than the conventional liquid power sources.

Solid electrolytes must be essentially electronic insulators so as not to internally short the cell while at the same time they must allow ionic movement in the crystal lattice for the cell to operate. It has been discovered that certain metallic salts which are solids at room temperatures have specific conductances sufficiently high to permit their use in practical battery applications. For example, U.S. Pat. No. 3,723,185 discloses solid state electrolytes of compounds conforming to the general formula AgI-MCN-AgCN or modifications thereof wherein M is potassium, rubidium, cesium or mixtures thereof.

Filed concurrently herewith by applicant and incorporated herein by reference is U.S. application Ser. No. 973,552 titled Solid State Electrolyte disclosing a relatively highly conducting solid state electrolyte made from a ternary mixture of lead fluoride, a 0.1 to 15.0 mole percent of a selected alkali salt of sodium, potassium, rubidium and cesium, and a 1 to 40 mole percent of a fluoride, nitrate or sulfate of magnesium, calcium, strontium or barium.

It is an object of the present invention to provide a novel ionically conductive product that is solid at room temperature and has a high conductance to permit its use as a solid state electrolyte for battery applications.

Another object of the present invention is to provide a novel solid state electrolyte for battery applications that is essentially an electronic insulator so as not to internally short the cell in which it is to be used while at the same time it will allow ionic movement in the crystal lattice.

Another object of the present invention is to provide a novel solid state electrolyte of a fused binary mixture containing lead fluoride as its major component, i.e., above 50% by weight of the mixture, and having a stable ionic conductivity at room temperature thus making it admirably suitable for battery applications.

It is another object of the present invention to provide a relatively highly conducting solid electrolyte based on lead fluoride.

The foregoing and additional objects will become more fully apparent from the following description.

SUMMARY OF THE INVENTION

The invention relates to a solid state electrolyte comprising an ionically conductive product of a binary mixture of lead fluoride ($PbF_2$) and a range of between about 0.1 and about 15.0 mole percent of cesium fluoride or a metal salt having a cation component selected from the group consisting of sodium (Na), potassium (K), rubidium (Rb) and cesium (Cs) and an anion component selected from the group consisting of chloride, bromide, iodide, cyanide, nitrate, hydroxide, thiocyanate, carbonate, phosphate, sulfate, oxide, formate, acetate and oxalate. Preferably the above-referred to range should be between about 1 and 5 mole percent of the electrolyte. Preferably the solid state electrolytes of this invention should have an ionic conductivity of at least $10^{-5}$ ohm$^{-1}$ centimeter$^{-1}$.

Suitable metal salts for use in this invention include potassium carbonate, potassium sulfate, potassium bromide, cesium fluoride, potassium phosphate and potassium hydroxide.

While both alpha-$PbF_2$ and beta-$PbF_2$ are anionic conductors, the beta-$PbF_2$ is more conductive but, nonetheless, neither is of the low resistivity that would be highly desirable in a solid electrolyte application. Beta-$PbF_2$ has a specific resistivity of about $5 \times 10^6$ ohm-cm, while that of alpha-$PbF_2$ is about $5 \times 10^7$ ohm-cm. If ordinary lead fluoride is heated for a short time above about 350° C. and then cooled, it is entirely converted to the beta form with a characteristic X-ray pattern. However, it has been observed that when this material is compressed to make a pellet for a conductivity measurement, it transforms partially to the alpha form. Although the resistivity of beta-$PbF_2$ is at levels marginally useful as a solid electrolyte in battery applications, the instability and reversion to the alpha form manifests itself in an increasing resistivity with increase of pressure such as would be employed in the fabrication of a solid electrolyte battery and with increase of temperature and age such as might be experienced during storage of a battery.

It has been discovered that with the addition of the above-referred to metal salts in a range between about 0.1 and about 15.0 mole percent to the lead fluoride, the product of the fused binary mixture will have a high ionic conductivity thereby making it suitable for use in battery applications as a solid state electrolyte. It was also unexpectedly found that the addition of the above-referred to materials to lead fluoride had beneficial stabilizing effects on the ionic conductivity of the lead fluoride.

EXAMPLE 1

To observe the effect of potassium salts on the resistivity of lead fluoride, several potassium salts as shown in Table I were combined with lead fluoride in the following manner. Each of the potassium salts and lead fluoride were separately vacuum dried approximately at 140° C. for approximately 2 hours. Then the $PbF_2$ and the various amounts of the potassium salt as shown in Table I were mixed, placed in a platinum boat contained in a quartz vessel flushed with argon and slowly heated up to as high as 850° C. to melt the materials. In the case of easily decomposable or volatile salts, slow heating was used to the minimum temperature necessary to melt the mixture. The melt was held at the elevated temperature for 15 to 20 minutes to insure an homogeneous mixture. The cooled solidified material was then removed from the boat, transferred to a dry box and crushed in an agate mortar. Pellets of the material were then made in a Carver Laboratory press at about 45,000 psi. The resistivity of the pellets so formed was measured and the results obtained are shown in Table I. As evident from the data shown in Table I, the resistivity of lead fluoride which is from $10^6$ to $10^7$ ohm-cm decreased with the addition of the potassium salts to values as low as $10^3$ ohm-cm.

TABLE I

| Salt Added | Mole Percent K Salt | | | | | | | | | | | |
|---|---|---|---|---|---|---|---|---|---|---|---|---|
| | 1 | 2 | 2.5 | 3 | 3.5 | 4 | 5 | 6 | 7 | 8 | 9 | 10 | 15 |
| | Specific Resistivity, ohm.cm $\times 10^3$ | | | | | | | | | | | |
| $KNO_3$ | 3.6 | | | 3.5 | | 1.8 | 1.6 | | | 3.0 | | | |
| KCl | | | 6.3 | | | 2.2 | | 1.8 | 1.3 | 1.4 | | 1.8 | |
| KI | 62.5 | 5.3 | | 3.0 | | | | 1.3 | | 2.1 | | 2.0 | |
| KBr | | | | | | | 1.9 | | | | | | |
| KOH | | | | 2.7 | | 2.5 | | | | | | 1.2 | 2.2 |
| KCNS | | | | | | | 2.9 | | | | | 2.0 | |
| $K_2CO_3$ | 15.0 | | | | | | 1.8 | | | | | 3.4 | |
| $K_4P_2O_7$ | | | | 3.5 | 3.3 | 1.4 | 1.5 | | | | 1.9 | 2.3 | |
| $K_2SO_4$ | | | | | | | 3.0 | | | | | | |
| $K_2O$ | | | | | | | 2.0 | | | | | | |

EXAMPLE 2

Lead fluoride and potassium nitrate were separately vacuum dried for one hour. The former was heated at 140° C. during the treatment, while the latter was heated at 95° C. 11.88 gms $PbF_2$ and 0.15 gms $KNO_3$ were mixed and placed in the platinum boat in the apparatus described in Example 1. The temperature was slowly raised to the minimum temperature required to insure homogeneity of the mixture. The material was cooled under argon until solid, transferred to a dry box and crushed in an agate mortar. Pellets of this binary mixture were made at about 45,000 psi in a Carver press and had a resistivity of 3500 ohm-cm at room temperature.

EXAMPLE 3

Using the procedure outlined in Example 2, various solid state electrolyte pellets were produced using KBr, $K_2CO_3$, $K_2SO_4$, RbCl and KI in place of $KNO_3$. The resistivity of each pellet was measured and the results obtained are shown in Table II along with weights of the lead fluoride and the added metal salt. As evident from the data shown in Table II, the resistivity of the solid ionically conductive products produced is sufficiently low thereby making them admirably suited for battery applications.

TABLE II

| Metal Salt/$PbF_2$ Weights Used (gms) | Resistivity (ohm-cm) |
|---|---|
| (KBr) 0.30/11.63 ($PbF_2$) | 1900 |
| ($K_2CO_3$) 0.34/11.63 ($PbF_2$) | 1800 |
| ($K_2SO_4$) 0.43/11.63 ($PbF_2$) | 3000 |
| (RbCl) 0.30/11.63 ($PbF_2$) | 3900 |
| (KI) 0.75/11.15 ($PbF_2$) | 2000 |

EXAMPLE 4

To test the solid state electrolyte of this invention in a cell, a lead disc anode, a solid electrode made from a molar mixture of 0.95 $PbF_2$-0.05 $K_2CO_3$ and a cathode consisting of 1:1 molar $PbO_2$-$MnF_3$ were compressed together in a cavity of 1 sq. cm. cross section at about 12,000 psi. The open circuit voltage of the cell so produced was 1.71 volts and when discharged across a 100 K-ohm resistor, the closed circuit voltage was 1.59 volts. Thus the solid state electrolyte of this invention is admirably suited for battery applications.

EXAMPLE 5

A cell was produced as described in Example 4 except that the cathode employed was $PbO_2$. The open circuit voltage of the cell was observed as 1.04 volts and when discharged across a 100 K-ohm resistor, the closed circuit voltage was 0.96 volt.

The solid state electrolytes of this invention can be employed with various cell systems employing an anode such as lead or any metal more noble than lead and fluoride-containing solid cathodes.

What is claimed is:

1. A solid state cell electrolyte comprising an ionically conducting product of a fused binary mixture of lead fluoride ($PbF_2$) and a range of between about 0.1 and about 15.0 mole percent of cesium fluoride or a metal salt having a cation component selected from the group consisting of sodium, potassium, rubidium and cesium and an anion component selected from the group consisting of chloride, bromide, iodide, cyanide, nitrate, hydroxide, thiocyanate, carbonate, phosphate, sulfate, oxide, formate, acetate and oxalate.

2. The solid state electrolyte of claim 1 wherein the metal salt is potassium carbonate.

3. The solid state electrolyte of claim 1 wherein the metal salt is potassium sulfate.

4. The solid state electrolyte of claim 1 wherein the metal salt is potassium bromide.

5. The solid state electrolyte of claim 1 wherein the metal salt is cesium fluoride.

6. The solid state electrolyte of claim 1 wherein the metal salt is potassium phosphate.

7. The solid state electrolyte of claim 1 wherein the metal salt is potassium hydroxide.

8. The solid state electrolyte of claim 1 wherein the ionically conducting product is formed from the fused binary mixture $0.03\ KNO_3\text{-}0.97\ PbF_2$.

9. The solid state electrolyte of claim 1 wherein the ionically conducting product is formed from the fused binary mixture $0.05\ KBr\text{-}0.95\ PbF_2$.

10. The solid state electrolyte of claim 1 wherein the ionically conducting product is formed from the fused binary mixture $0.05\ K_2CO_3\text{-}0.95\ PbF_2$.

11. The solid state electrolyte of claim 1 wherein the ionically conducting product is formed from the fused binary mixture $0.05\ K_2SO_4\text{-}0.95\ PbF_2$.

12. The solid state electrolyte of claim 1 wherein the ionically conducting product is formed from the fused binary mixture $0.05\ RbCl\text{-}0.95\ PbF_2$.

13. The solid state electrolyte of claim 1 wherein the ionically conducting product is formed from the fused binary mixture $0.09\ KI\text{-}0.91\ PbF_2$.

* * * * *